United States Patent [19]

Crisick

[11] Patent Number: 5,459,930

[45] Date of Patent: Oct. 24, 1995

[54] ALIGNMENT GAUGE FOR BICYCLE WHEEL TRUING STAND

[76] Inventor: William E. Crisick, 3593 Whitehaven Dr., Walnut Creek, Calif. 94598

[21] Appl. No.: 301,326

[22] Filed: Sep. 6, 1994

[51] Int. Cl.[6] .................................................. G01B 5/14
[52] U.S. Cl. .................................. 33/201; 33/203; 33/545
[58] Field of Search ........................ 73/1 R, 1 J; 33/201, 33/203, 286, 365, 502, 545, 567, 626, 645

[56] References Cited

U.S. PATENT DOCUMENTS

| 3,507,027 | 9/1970 | Jaulmes . | |
|---|---|---|---|
| 3,789,475 | 2/1974 | Barwell . | |
| 3,841,379 | 10/1974 | Kinney . | |
| 3,869,801 | 3/1975 | Lycan | 33/645 |
| 4,045,852 | 9/1977 | Winch . | |
| 4,418,738 | 12/1983 | Kaufeldt . | |
| 4,585,046 | 4/1986 | Buckley . | |
| 4,868,993 | 9/1989 | Kvale | 33/286 |
| 5,201,782 | 4/1993 | Bartlett | 33/203 |

OTHER PUBLICATIONS

United Bicycle Tool. 1994 Spring & Summer Catalogue, pp. 64, 65, 66.
J. A. Stein Co. Product Catalog, Center foldout page, 2nd item from top.

Primary Examiner—William A. Cuchlinski, Jr.
Assistant Examiner—G. Bradley Bennett

[57] ABSTRACT

An apparatus for aligning bicycle wheel truing stands is disclosed having a gauge bar (10), hub pin (20), and gauge pin (30), which combine together to represent those certain parts, or features, or physical manifestations, or characteristics of a perfectly true, perfectly dished bicycle wheel, and being, by virtue of its construction and manufacture, accurate for use in aligning bicycle wheel truing stands.

3 Claims, 5 Drawing Sheets

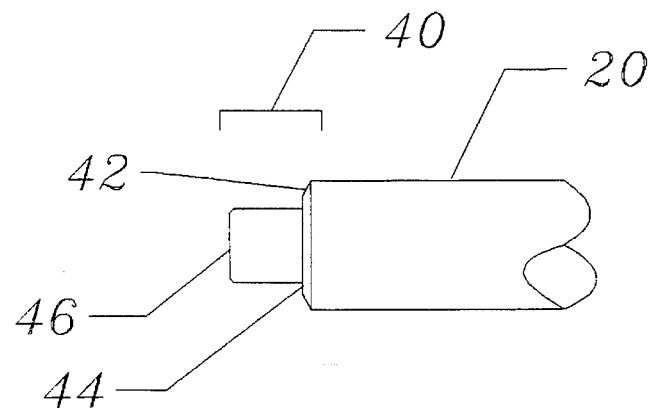
Fig. 4
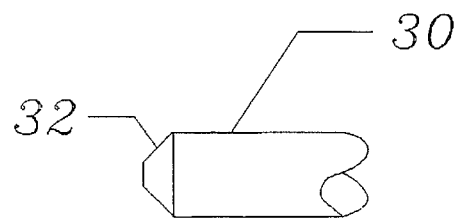
Fig. 5
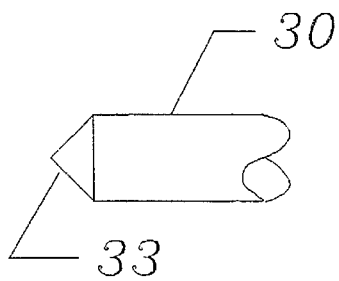 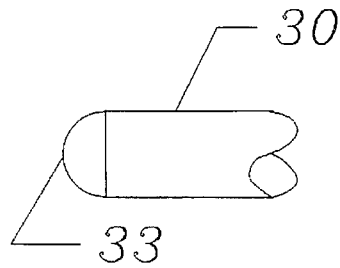 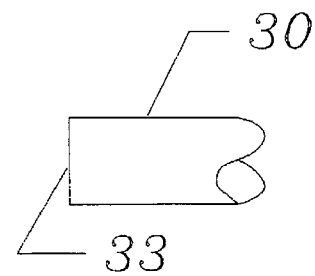
Fig. 5A　　　Fig. 5B　　　Fig. 5C

ALIGNMENT GAUGE FOR BICYCLE WHEEL TRUING STAND

BACKGROUND

1. Field of Invention

The present invention relates generally to the manual truing of spoked bicycle wheels and, more particularly, to the use of a wheel truing apparatus for hand truing of spoked wheels, and specifically to an apparatus for aligning wheel truing stands used for hand truing wire spoke bicycle wheels.

2. Discussion of Prior Art

Various apparatus and methods for assembling, tensioning, and truing (or aligning) spoked bicycle wheels are well known to those skilled in the art. A partial listing of patents which disclose pertinent methods and apparatus includes: U.S. Pat. No. 3,507,027, which issued on Apr. 21, 1970 to Eric Jaulmes; U.S. Pat. No. 3,789,475, which issued on Feb. 5, 1974 to Ian John Barwell; U.S. Pat. No. 3,841,379, which issued on Oct. 15, 1974 to Gary W. Kinney; U.S. Pat. No. 4,045,852, which issued on Sept. 6, 1977 to Andrew Gordon Winch; U.S. Pat. No. 4,418,738, which issued on Dec. 6, 1983 to Roland Kaufeldt; and U.S. Pat. No. 4,585,046, which issued on Apr. 29, 1986 to Ronald E. Buckley. All of the above listed patents disclose apparatus and/or methods for automated truing of spoked wheels, and are thus of limited relevance to the present invention, which relates to hand truing of spoked bicycle wheels.

Buckley discloses an apparatus comprising a tool capable of clamping the shank of each spoke nipple and rotating the nipple in the appropriate direction to increase or decrease the tension on the spoke, and means of determining the position of the rim portion associated with the respective spoke relative to a reference vertical plane and relative to a preferred reference circle. By increasing or decreasing the tension in each spoke in succession the rim is aligned in the vertical plane and in the preferred reference circle. Buckley thoroughly recites the components comprising a spoked bicycle wheel, the disposition of those components relative to one another, and the structure and requirements for disposition and alignment of the components so as to achieve the state of trueness for the wheel, all of which is well known to wheel-wrights and others skilled in the art of wheel building and truing. He further recites the method and procedure employed during manual truing of a spoked wheel, and briefly describes the configuration of a support apparatus, generally :referred to as a truing stand, that could be used for manually truing a spoked wheel. Buckley also describes the ideal or preferred alignment of a wheel rim with respect to its hub by reciting that the plane of the rim intersects the hub at a point generally midway between the hub's flanges. While this is true for a front wheel, the hub of which is generally symmetrical about the midpoint on the central axis of its axle, and thus about the midpoint between its flanges, it is not generally true for a rear wheel. The hub of a rear wheel is asymmetric about a vertical plane midway between the hub flanges, owing to the need to allow space and means for attachment of gear cogs on the right hand side of the bicycle. For both front and rear wheels the plane of the rim will ideally intersect the hub at a point midway between the hub's locknuts, which are associated with the anti-friction bearing mechanism disposed between the hub and its axle. The locknuts are the members of the wheel hub assembly that are in contact with the respective bicycle frame members in which the wheel is mounted. The locknuts thus determine the disposition of the wheel hub, and therefore the rim, with respect to the frame. The desired disposition of the rim is midway between the respective frame members of the bicycle. To achieve this desired disposition of the rim, the plane of the rim must be equidistant from the locknut at either end of the axle. This requirement for centering the rim between the locknuts, but not necessarily with respect to the hub flanges, is often referred to by practitioners of the art of wheel building as dishing, or the dish of a wheel.

BACKGROUND—DISCUSSION OF THE WHEELWRIGHT'S ART

As recited and discussed above, bicycle wheels must be true and correctly dished. Front wheels have equal dishing on both sides, being dimensionally symmetrical about a flat vertical plane through the center of a cross-section of the rim. Rear wheels have unequal dishing to allow space for gear cogs on the right hand side of the wheel, and are not symmetrical. Generally the spokes on the right side of a rear wheel are shorter than the spokes on the left side. Also, the spokes may be observed to leave the hub flange at a greater angle from horizontal. Furthermore, spoke tension is greater on the right side than on the left side. The aforesaid not withstanding, the rim of both a front and a rear wheel must be centered between the locknuts of the wheel's hub.

The dish of a wheel may be determined directly by using a dishing tool. This device consists of a generally concave-shaped bar which bridges the rim across a diameter of the wheel. In the center of the bar pointing inward toward the axle locknut is an adjustable indicator. The dishing tool is placed across the rim and the indicator adjusted to just touch the locknut on that side of the wheel, thus determining the rim-to-locknut dimension. The wheel is then turned over and the rim-to-locknut dimension of the opposite side checked. If these dimensions are not equal the wheel's dish must be corrected. Several varieties of dishing tools are available from various manufacturers such as Campagnolo (Italy), Minoura (Japan), Park Tool Company (USA), Var (France), and Wheelsmith Fabrications (U.S.A.). Each of these dishing tools is shown on Page 64 of the Spring & Summer 1994 catalogue of United Bicycle Tool Company of Ashland, Ore.

Hand truing of wire spoked wheels is accomplished through a process of sequential tightening and loosening of spokes while observing and/or measuring the roundness and wobble of the rim. Hand truing is most accurately performed with the wheel in a truing stand. Centering the rim between the locknuts, or dishing, is perfected as the wheel is trued and spoke tension is increased to the desired level.

Changing the dish of a fully tensioned wheel is accomplished by tightening all the spokes attached to one flange of the hub, and loosening all the spokes attached to the other flange, to move the rim the desired amount in the desired direction. The amount of spoke adjustment required to correct a wheel's dish error is subjectively determined based on the dishing tool measurements and the experience of the wheelwright. An added element of complexity occurs because spoke tension is different on each side of a rear wheel, requiring that the spokes attached to each respective hub flange be tightened and loosened by a different amount to achieve the required movement of the rim while maintaining correct spoke tension.

Adjustment of the spokes to correct dishing error generally introduces out-of-trueness in the wheel, which must subsequently be corrected. Thus, truing and dishing a wheel by hand using a truing stand and dishing tool is a repetitive process which requires at least two and generally more iterations.

DRAWING FIGURES

FIG. 4 shows detail of the mammilated portions of the Hub Pin.

FIGS. 5, 5A, 5B and 5C show details of the ends of the Gauge Pin.

REFERENCE NUMERALS IN DRAWINGS

1 Truing Stand Alignment Gauge of the present invention
2 Adjustable Leg Truing Stand (prior Art)
10 Gauge Bar
20 Hub Pin
30 Gauge Pin
32 Truncated Cone
33 Gauge Pin Tip
40 Mammilated Section
42 Chamfer
44 Annulus
46 Tip
50 Leg Bracket: 50L (left); 50R (right)
52 Leg: 52L (left); 52R (right)
53 Syncline Notch
54 Caliper Arm
56 Caliper: 56L (left); 56R (right)
58 Caliper Arm Shaft
60 Caliper Arm Shaft Nut: 60L (left); 60R (right)
61 Centering Groove
62 Main Shaft
64 Shaft Adjusting Collar
66 Caliper Arm Bracket
68 Set Screw

BACKGROUND—DISCUSSION OF TRUING STANDS (PRIOR ART)

The majority of available truing stands are of the fixed-leg variety. Examples of fixed leg truing stands are those manufactured by Hozan, Minoura, Park Tool, Pure Cycle, and Var. These are shown on Pages 65 and 66 of United Bicycle Tool Company's aforementioned catalogue. To perfect wheel dish with this type stand the wheelwright must either use a dishing tool, or the wheel must be turned over several times during the truing process. Each time the wheel is turned over the dish error is apparent at the truing indicators. The error is reduced in repetitive steps of sequentially adjusting spokes until dish error is within acceptable tolerances. As before, each time dish is perfected fine-truing must be repeated. In either case, whether the wheel builder uses a dishing tool or turns the wheel over in the stand, truing and dishing the wheel is a repetitive, trial-and-error process, and thus very time consuming.

Figure 2:
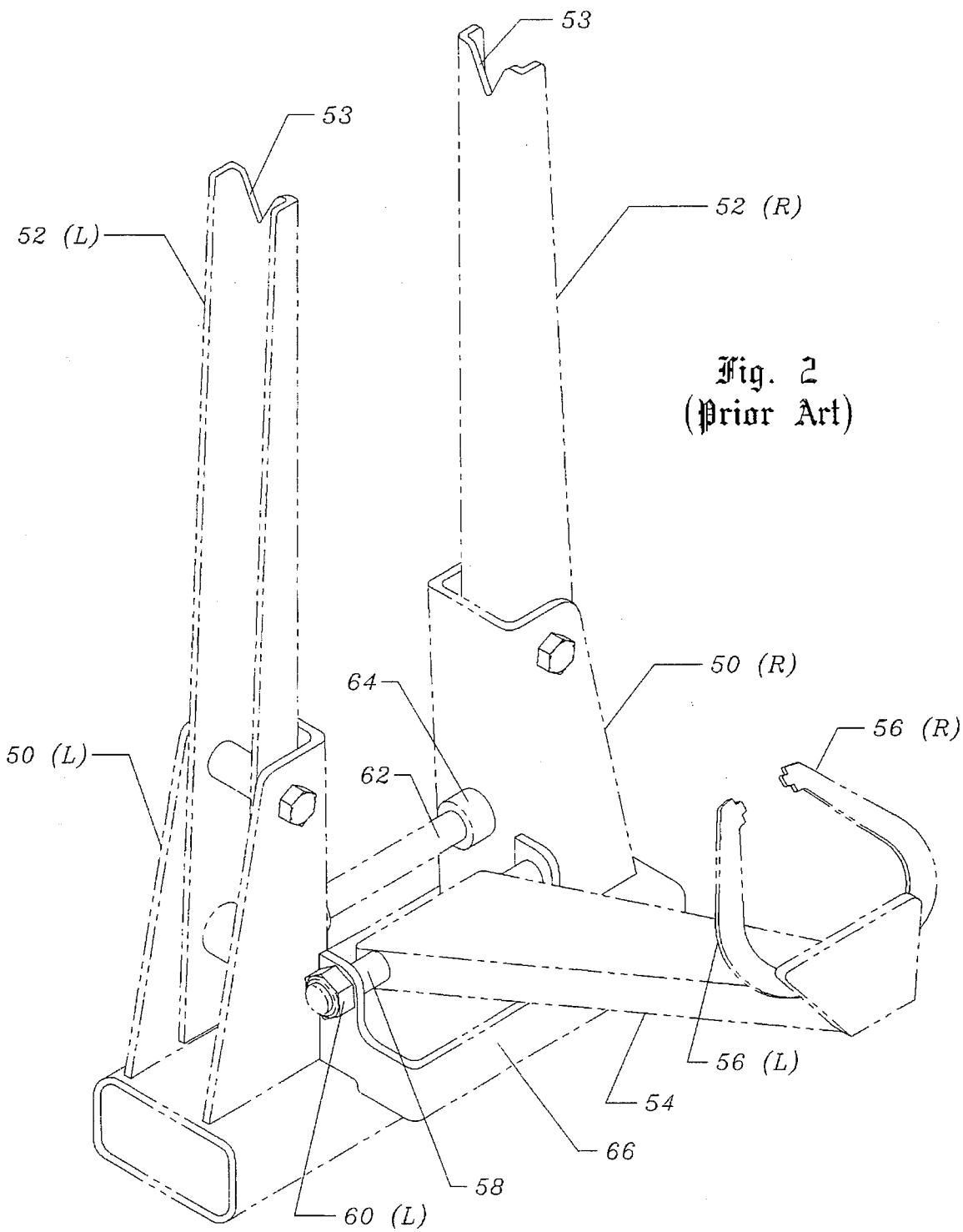
FIG. 2 shows an adjustable leg truing stand (prior art).

An improvement to fixed-leg truing stands is the adjustable leg truing stand. One of the most widely used adjustable-leg truing stands is the Model TS-2, manufactured by Park Tool Company of St. Paul, Minn. The TS-2, illustrated in FIG. 2, comprises two rigid, vertical legs 52 pivotally attached to leg brackets 50. Leg brackets 50 are rigidly attached to the stand's base. At the top of each leg is a syncline notch 53 that supports a wheel by the ends of its hub axle, the wheel being retained in notch 53 by the action of gravity. The upper ends of legs 52 move in and out to accommodate wheels having hubs of various dimensions. The movement of legs 52 is interlocked together and controlled by means of a main shaft 62 having threads of equal but opposite pitch on either end. Threadedly connected at opposite ends of main shaft 62 are pivot bushings, the ends of which are retained by an aperture in the sides of legs 52. Rotation of main shaft 62 causes the pivot bushings, and thereby legs 52, to move by equal amounts in opposite directions. Thus, the midpoint between notches 53 in legs 52, and therefore the midpoint between the locknuts of any wheel hub which has been placed in the stand, will coincide, and be located at the same position between leg brackets 50. The position of the midpoint between legs 52 with respect to leg brackets 50 and the stand base is fixed under normal circumstances of use, but may be changed for purposes of aligning the stand. The disposition of main shaft 62 with respect to leg brackets 50 and the stand base is determined and controlled by two shaft adjusting collars 64 rigidly attached to, and which rotate with, main shaft 62. Each shaft adjusting collar 64 is located just inside its respective leg bracket 50, and is fixed to main shaft 62 by set screws. If shaft adjusting collars 64 are loosened main shaft 62 will slide back and forth horizontally with respect to leg brackets 50 and the stand base. Because main shaft 62 is attached to legs 52 by means of the threaded pivot bushings, legs 52 also move with main shaft 62. Thus, the position of legs 52 with respect to leg brackets 50 may be adjusted. It therefore follows that the position of the midpoint between legs 52 may be positioned so as to coincide with the midpoint between leg brackets 50.

A pair of adjustable calipers 56 are pivotally attached to the end of a caliper arm 54. Caliper arm 54 is pivotally attached to the base of the stand so that its upper end may move along an arcuate path which lies in a plane generally perpendicular to the central axis of the hub axle of a wheel hub that has been placed in the stand. Caliper arm 54 and calipers 56 cooperatively incorporate means to allow calipers 56 to be opened and closed in unison to accommodate rims of varying width. The disposition of the midpoint between calipers 56 is fixed during normal circumstances of use, but may be adjusted for purposes of aligning the stand. The disposition of the midpoint between calipers 56 is determined by the location of caliper arm 54 along a horizontal axis with respect to the stand base. Caliper Arm 54 comprises a caliper arm shaft 58 at its lower end which is pivotally connected to a caliper arm mounting bracket 66. Caliper Arm Mounting Bracket 66 is rigidly attached to the stand base. Caliper Arm Shaft 58 is secured in its bracket by a threaded nut 60 at either end of the shaft. By rotating both of these nuts in the same angular direction and by the same angular distance, caliper arm shaft 58 and thus caliper arm 54, may be moved along an axis generally parallel to the central axis of the axle of a wheel hub mounted in the stand. Thus the position of the midpoint between calipers 56 may be aligned to coincide with the midpoint between leg brackets 50, and likewise the midpoint between legs 52. When the midpoints of leg brackets 50, legs 52, and calipers 56 are in the same plane and that plane is perpendicular to the central axis of the hub axle and contains the midpoint between the locknuts of the hub, the stand is correctly aligned.

Wheel roundness is the condition wherein all points on a circumference of the rim are radially equidistant from the central axis of the axle. Roundness is visually observable by maneuvering and positioning caliper arm 54 and calipers 56 so that calipers 56 are nearly in contact with a circumference of the rim. As the wheel is rotated, out-of-roundness is apparent. Wheel wobble is the condition wherein, when the wheel is rotated about the axle, portions of the rim will vary from a single flat plane perpendicular to the central axis of the axle. In the truing stand, a wheel rim's wobble is observed by maneuvering and positioning calipers 56 to nearly contact one or both sides of the rim of the rotating wheel.

An adjustable-leg truing stand is capable of perfecting correct wheel dish as the spokes are tensioned and the wheel trued. However, this capability can be utilized, and a correctly dished wheel obtained, only if the stand is in alignment at the time the wheel is trued. As the spokes are tensioned and the wheel is trued, the plane of the rim will be positioned at some point along, and perpendicular to, the central axis of the hub, that point being determined by the relative position of the midpoint between the truing stand legs and the midpoint between the truing calipers. If the truing stand is in alignment as specified previously, the resulting wheel will have correct dish.

Truing stands can become misaligned from a variety of causes, including but not limited to, misuse, dropping, over-tightening of main shaft 62, accidental blows while performing other repairs to a wheel in the stand, and while handling or moving the stand from and to its storage location.

Park Tool Company recommends periodic alignment of their TS-2 truing stand using a perfectly dished wheel. The dis-advantages of this approach are several:

(a) It is time consuming to verify that one has a perfectly dished wheel for use in aligning the stand;

(b) A perfectly dished wheel may not be available to use to align the stand.

(c) It is difficult to measure the distance between leg brackets 50 and the rim to ascertain that the rim, and by implication legs 52 of the truing stand, are centered in leg brackets 50 and thus the stand base;

(d) Measuring the distance between leg brackets 50 and the rim is inherently inaccurate.

(e) Any out-of-true condition or error in the dish in the supposed perfect wheel will be transferred permanently to the truing stand one is attempting to align.

The J. A. Stein Co., of Prescott, Ariz., shows in its catalogue a Fork Alignment Gauge, and describes an alternate use of aligning (or calibrating) truing stands. The disadvantage of this tool for aligning truing stands is that it does not allow accurate alignment of legs 52 in the stand base due to the length of its lower pin. This pin is longer than the distance between leg brackets 50. Thus the gauge will not swing between leg brackets 50, and legs 52 cannot be accurately centered between leg brackets 50. Furthermore, the Stein tool does not incorporate means to reduce its tendency to ride up in the notches of legs 52 when the tool is swung up into position for aligning calipers 56.

OBJECTS AND ADVANTAGES OF THE TRUING STAND ALIGNMENT GAUGE

Accordingly, several objects and advantages of the present invention are:

(a) to provide a precision gauge for aligning adjustable-leg bicycle wheel truing stands so as to allow and cause the stand to produce correctly dished wheels;

(b) to provide a faster method for aligning truing stands;

(c) to provide a more accurate tool for aligning truing stands;

(d) to provide a faster method to true wheels;

(e) to provide a faster method to dish wheels.

Further objects and advantages will become apparent from a consideration of the ensuing description and drawings.

DESCRIPTION OF THE PRESENT INVENTION—FIG. 1

Figure 1:
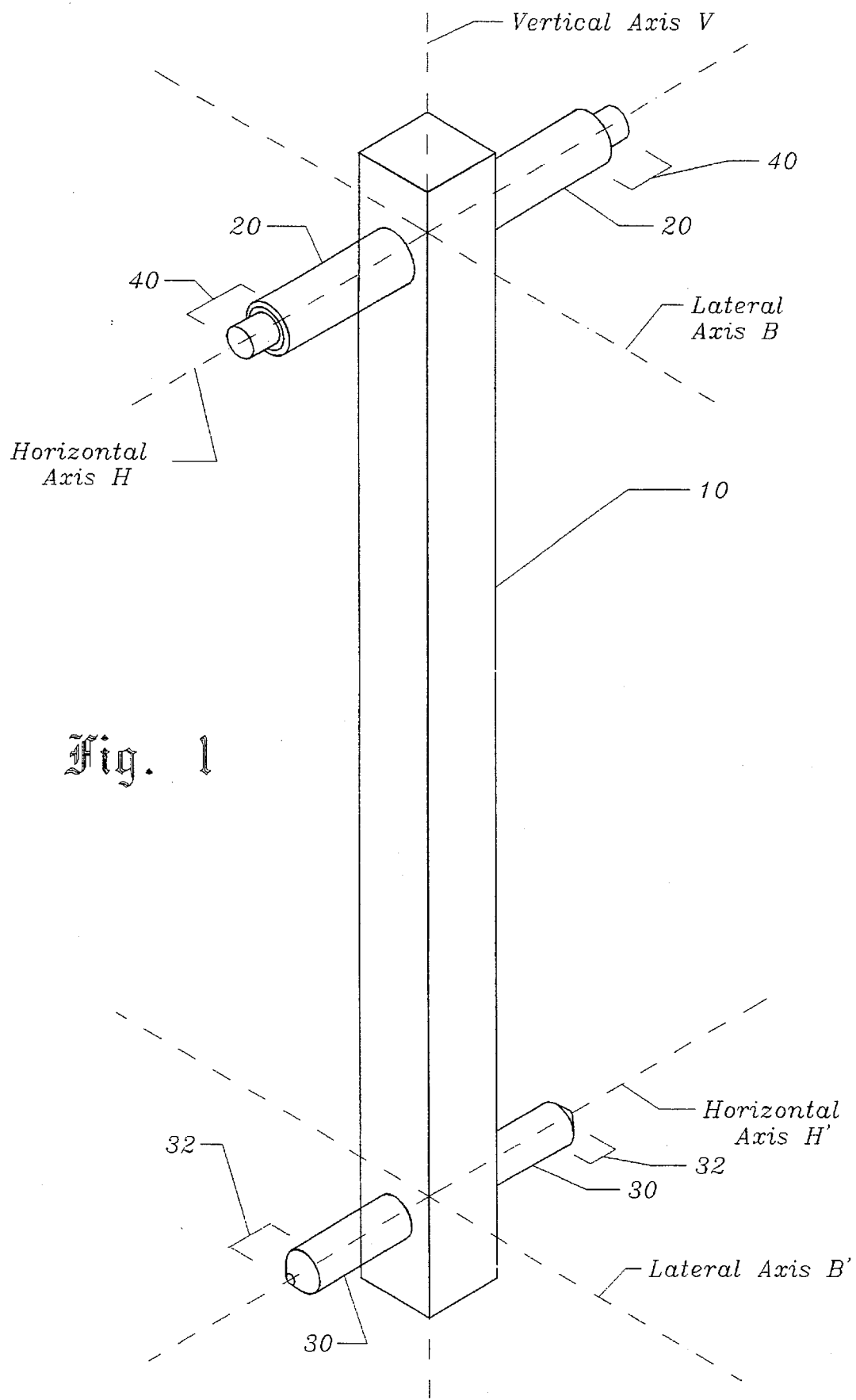
FIG. 1 shows the Truing Stand Alignment Gauge in orthogonal view.

A typical embodiment of the Truing Stand Alignment Gauge (hereinafter, if not spelled out, referred to for convenience as "TSAG" or "GAUGE") of the present invention is illustrated in FIG. 1. The Truing Stand Alignment Gauge comprises a vertical member or gauge bar 10, which comprises a bar of square cross section approximately 25 mm on a side, and approximately 36 cm in length. The central axis of gauge bar 10 passing through the center of two or more horizontal cross sections of gauge bar 10 defines Vertical Axis V, shown in FIG. 1. Gauge bar 10 must be sufficiently rigid so that it cannot be bent by hand and will not deflect under moderate loads that may be applied during use. In this embodiment gauge bar 10 is aluminum, though other materials such as wood, steel, plastic, nylon, carbon-fiber, metal composites, cardboard, paper, etc., would serve as well, providing that dimensional and rigidity requirements are met. Approximately 25 mm from one end of gauge bar 10 and protruding out from opposite sides of gauge bar 10, is an upper horizontal member, hub pin 20. Approximately 30 cm further along gauge bar 10 beyond hub pin 20, and protruding out from opposite sides of gauge bar 10 on an axis parallel to the central axis of hub pin 20, is a lower horizontal member, gauge pin 30.

Hub pin 20 comprises a bar, rod, axle, or pin of circular cross section approximately 16 mm in diameter, each end protruding approximately 57 mm from opposite sides of gauge bar 10. At each opposite end of hub pin 20 is a mammilated section 40, shown in detail in FIG. 4. The mammilated section comprises a chamfer 42, annulus 44, and tip 46. Chamfer 42 reduces the tendency of the hub pin to ride up in syncline notches 53 of truing stand legs 52 when legs 52 are brought into contact with annuluses 44. The angle of chamfer 42 is approximately 80 degrees from the axis of hub pin 20. The width of annulus 44 is approximately 3.2 mm. The dimensions of tip 46 are approximately 9.5 mm diameter by 9.5 mm long. The exact dimension of the diameter of tip 46 is not critical. However, it is critical to successful operation of the Truing Stand Alignment Gauge that diameters of tip 46 at each end of hub pin 20 be within 0.025 mm of each other. It is also critical that the cylindrical surfaces of each tip 46 be concentric with the central axis of hub pin 20 within 0.012 mm. It is further critical that the distances from Vertical Axis V to annulus 44 at each end of hub pin 20 be within plus or minus 0.025 mm of each other. The central axis of hub pin 20 defines Horizontal Axis H in FIG. 1, which must be perpendicular to both Vertical Axis V and Lateral Axis B. Lateral Axis B is perpendicular to both faces of gauge bar 10 through which it passes, and intersects both Vertical Axis V and Horizontal Axis H at their mutual point of intersection.

Gauge pin 30 comprises a bar, rod, axle, or pin of circular cross section approximately 13 mm in diameter, and protruding approximately 39 mm from opposite sides of gauge bar 10. At each opposite end of gauge pin 30 is a truncated cone 32, shown in detail in FIG. 5. The distance from Vertical Axis V of gauge bar 10 to the flat end of truncated cone 32 must be identical plus or minus 0.025 mm. In the present embodiment truncated cone 32 comprises a cone at an angle of approximately 45 degrees to the central axis of gauge pin 30, and a flat end approximately 3.2 mm in diameter. Additional possible embodiments of the ends of gauge pin 30 are shown FIGS. 5a, 5b, and 5c. In FIG. 5a it is pointed; in FIG. 5b it is rounded; in FIG. 5c it is flat. Still other embodiments are also possible. The central axis of gauge pin 30 defines Horizontal Axis H', shown in FIG. 1, which must be perpendicular to both Vertical Axis V and Lateral Axis B'. Lateral Axis B' is perpendicular to both faces of gauge bar 10 through which it passes, and intersects both Vertical Axis V and Horizontal Axis H' at their mutual point of intersection.

There are various possibilities with regard to the dimension by which each end of gauge pin 30 protrudes from gauge bar 10. The appropriate dimension is determined primarily by the distance between leg brackets 50 of the truing stand to be aligned, and secondarily by the dimensions of gauge bar 10. The overall dimension of gauge pin 30 from end to end, including gauge bar 10, must be such that the Truing Stand Alignment Gauge will fit between leg brackets 50 of the truing stand being aligned, yet result in the ends of gauge pin 30 being in sufficiently close proximity to leg brackets 50 that it is apparent by visual observation that the Truing Stand Alignment Gauge is centered between leg brackets 50. In the present embodiment this is accomplished by making gauge pin 30 replaceable with one of appropriate length. Additional embodiments of the present Truing Stand Alignment Gauge may accomplish this requirement in a plurality of ways.

Figure 6A:
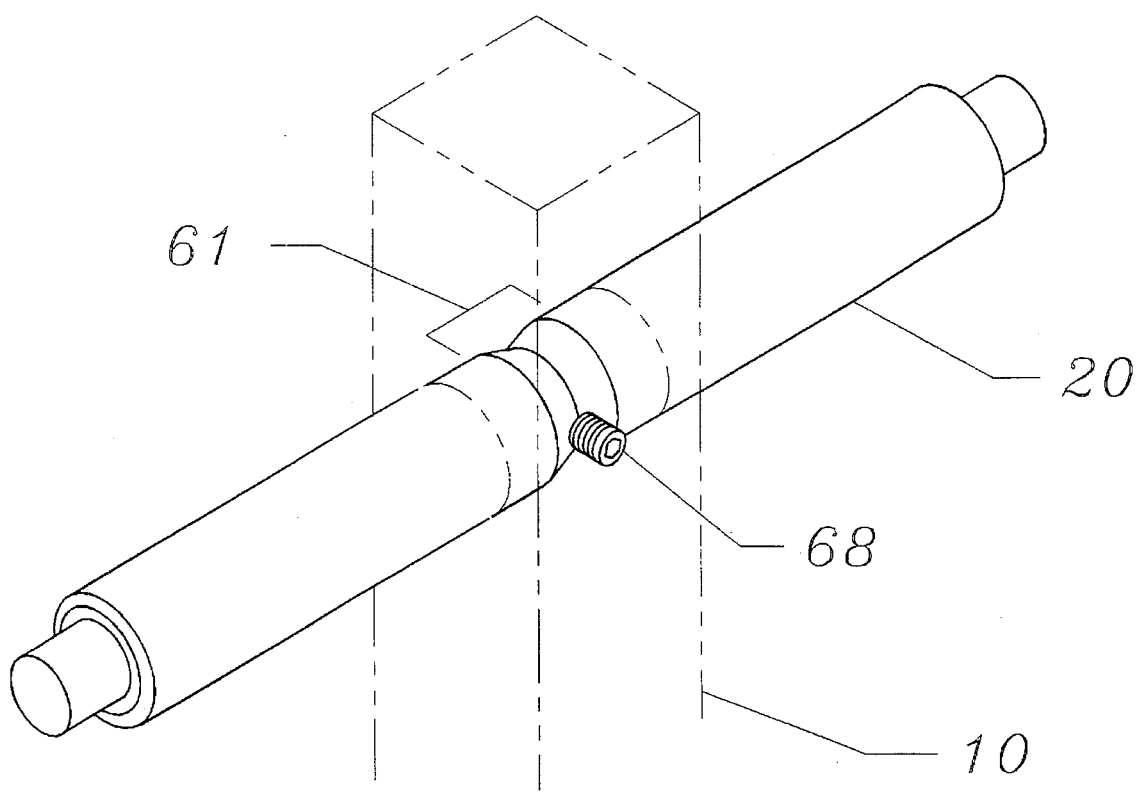
FIGS. 6A and 6B show details of the means and method of centering the Hub Pin and the Gauge Pin in the Gauge Bar in the present embodiment.
Figure 6B:
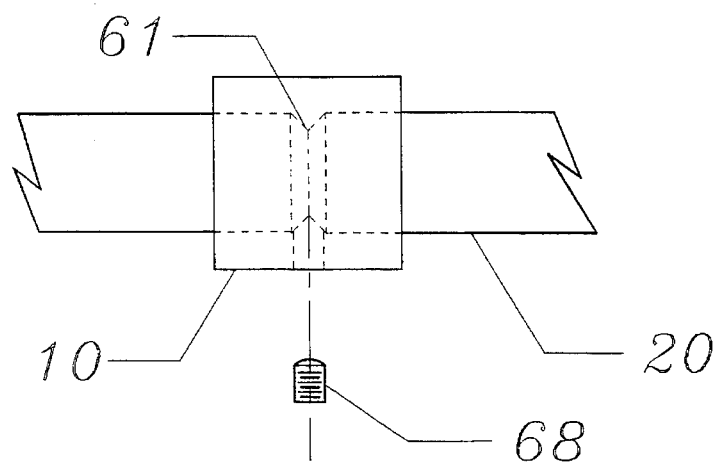

It is a requirement of the TSAG that annuluses 44 at each end of hub pin 20 be equidistant from Vertical Axis V. Likewise, each end of gauge pin 30 must be equidistant from Vertical Axis V. It is not a requirement that these dimensions be the same for both hub pin 20 and gauge pin 30, though that condition is acceptable. In the present embodiment the method for achieving the aforementioned requirement is shown in FIG. 6. Each of the pins, hub pin 20 and gauge pin 30, has a centering groove 61 such that the center of centering groove 61 is in the center of the pin, in the case of gauge pin 30, and equidistant from annuluses 44 in the case of hub pin 20. A set screw 68 having an oval head secures each pin in gauge bar 10. The centerline of each set screw hole is perpendicular to the surface into which it recesses, and intersects the central axis of gauge bar 10, thus causing the set screw and therefore the pins to be centered in gauge bar 10. Other methods that achieve the aforesaid dimensional identity requirement may be used in other embodiments of the invention.

OPERATION—FIG. 3

Operation of the Truing Stand Alignment Gauge may be most easily understood by visualizing the GAUGE as representing a section of a bicycle wheel having the properties of perfect trueness and perfect dish. Perfect wheel dish is the condition wherein the plane containing the centerline of a cross section of the wheel's rim is perpendicular to the central axis of the wheel's hub axle and intersects that central axis at the midpoint between the locknuts of the hub. More specifically, the GAUGE represents a narrow pie slice-shaped section of such a wheel. The Truing Stand Alignment Gauge has physical manifestations which correspond to the wheel axle (represented by tips 46), the hub locknuts (represented by annuluses 44), the spokes (represented by gauge bar 10), and the rim (represented by the lower end of gauge bar 40), which are the physical elements of a wheel on which its trueness and dish depend and by which they are determined.

Figure 3:
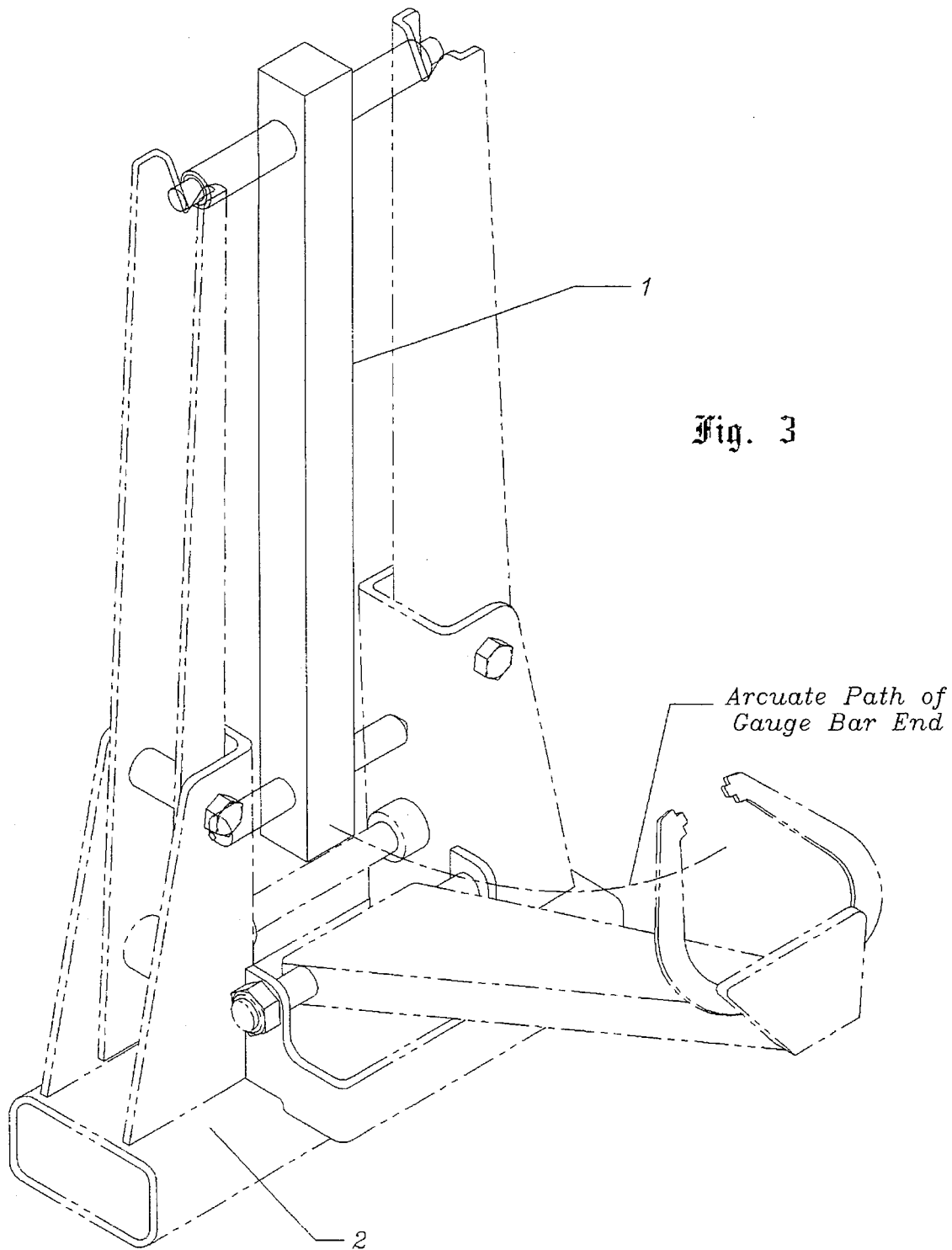
FIG. 3 shows an adjustable leg truing stand (prior art) with the Truing Stand Alignment Gauge in position for aligning the legs.

The manner of using the Truing Stand Alignment Gauge to align an adjustable leg truing stand is to place or hang the GAUGE in the stand by placing tips 46 into notches 53 of legs 52 of the truing stand, as shown in FIG. 3. Legs 52 may be moved in and out to accommodate the Truing Stand Alignment Gauge. Legs 52 should be disposed to just contact annuluses 44 of hub pin 20, and allow the gauge to swing freely in legs 52, while not allowing any horizontal play between annuluses 44 and legs 52. The lower section of the TSAG incorporating gauge pin 30 should hang between leg brackets 50. The normal operating position of legs 52 with respect to the stand base may be changed by following the stand manufacturer's instructions, and as described previously, so as to center legs 52 between leg brackets 50. This centered condition may be easily determined with the TSAG in place and hanging between leg brackets 50, by visually observing the distance from each end of gauge pin 30 to the respective leg bracket 50. The TSAG and legs 52 are centered when these distances are equal.

To center calipers 56 with respect to leg brackets 50, and thus at the midpoint between legs 52, the GAUGE is swung outward and upward in an arcuate path, as shown in FIG. 3, toward calipers 56 at the end of caliper arm 54. Caliper arm 54 and calipers 56 may be disposed so that calipers 56 are nearly in contact with the end of gauge bar 10, as if the end of gauge bar 10 was a wheel rim. If calipers 56 do not make contact with gauge bar 10 simultaneously, the horizontal position of caliper arm 54 may be changed by following the stand manufacturer's instructions, and as described previously, to dispose caliper arm 54 such that calipers 56 achieve the required simultaneous contact. When the simultaneous contact condition is obtained the truing stand is aligned, the midpoint between legs 52 and the midpoint between calipers 56 being both centered with respect to leg brackets 50, and being in the same vertical plane that is perpendicular to and bisects the horizontal distance between legs 52. In this condition the truing stand is aligned and will produce perfectly dished wheels.

SUMMARY, RAMIFICATIONS, AND SCOPE

Accordingly, the reader will see and note that the truing stand alignment gauge of this invention can be used to easily and accurately align a bicycle wheel truing stand. Furthermore, a truing stand that has been aligned with the truing stand alignment gauge will produce perfectly dished wheels, subject only to the skill and ability of the wheelwright. Use of the truing stand alignment gauge to align a truing stand has the following additional advantages in that ♦ it avoids the need to locate a perfect wheel with which to align the truing stand; ♦ it avoids the difficulties in making measurements that are required when using a wheel to align a truing stand; ♦ it avoids the inaccuracies in measurement that are inevitable when using a wheel to align a truing stand; ◊ it reduces the time required to true a wheel by eliminating the need to also use a dishing tool; ♦ it reduces the time to dish a wheel by automatically dishing the wheel as it is trued.

Although the above description contains many specificities, these should not be construed as limiting the scope of the invention, but as merely providing illustrations and examples of some of the presently preferred embodiments of this invention. For example, the truing stand alignment gauge may alternatively be fabricated as, for example, a machined casting or forging, of aluminum or other suitable material. Additionally, the gauge pin, which in the present embodiment is immovable when installed in the gauge bar, may be made to be simultaneously adjustable in and out, so as to provide even greater accuracy in aligning the truing stand, and so as to accommodate truing stands of differing dimensions between leg brackets 50 without having to change the gauge pin.

Thus the scope of the invention should be determined by the appended claims and their legal equivalents, rather than by the examples given.

I claim:

1. An apparatus for aligning a bicycle wheel truing stand comprising:

(a) means to dispose said apparatus, when said apparatus is depended from the legs of said truing stand, such that said apparatus cooperates with said truing stand to represent a perfectly true, perfectly dished bicycle wheel, said disposing means comprising an upper horizontal member, each opposite extremity of said upper horizontal member being shaped to represent the axle and a locknut of said bicycle wheel, comprising at each said opposite extremity of said upper horizontal member a cylindrical portion of predetermined diameter and length representing said axle, the diameters of said cylindrical portions at each said opposite extremity being equal, and said cylindrical portion being concentric with the central axis of said upper horizontal member, and an annulus of predetermined dimensions representing said locknut, said annuluses each being centrally disposed from said cylindrical portions and each at the same predetermined distance from the midpoint on said central axis of said upper horizontal member;

said upper horizontal member being retained in a vertical member such that said central axis of said upper horizontal member is perpendicular to the central axis of said vertical member, and also perpendicular to a lateral axis of said vertical member, said lateral axis being perpendicular to the lateral faces of said vertical member through which said lateral axis passes, and said lateral axis passing through the intersection of said central axis of said upper horizontal member and said central axis of said vertical member, and such that said midpoint of said central axis of said upper horizontal member lies on said central axis of said vertical member;

(b) first means to indicate said legs of said truing stand are centered with respect to the leg brackets of said truing stand, said first indicating means comprising a lower horizontal member of predetermined dimensions and shape, said lower horizontal member being depended from said upper horizontal member by said vertical member, said lower horizontal member having a tip of predetermined shape and dimensions at either end, said tip being conducive to visually determining said first indicating means is midway between said leg brackets of said truing stand, each of said tips at either end of said lower horizontal member being disposed at the same predetermined distance from said central axis of said vertical member;

said lower horizontal member being retained in said vertical member such that said central axis of said lower horizontal member is perpendicular to the central axis of said vertical member, and also perpendicular to a lateral axis of said vertical member, said lateral axis being perpendicular to the lateral faces of said vertical member through which said lateral axis passes, and said lateral axis passing through the intersection of said central axis of said lower horizontal member and said central axis of said vertical member, and such that the midpoint of said central axis of said lower horizontal member lies on said central axis of said vertical member;

(c) second means to indicate the calipers of said truing stand are centered with respect to said leg brackets of said truing stand, said second indicating means comprising the lowermost portion of said vertical member when said apparatus is rotated in an arcuate path about the central axis of said upper horizontal member, and is disposed such that said calipers are proximate to said lowermost portion of said vertical member as if said lowermost portion was the rim element of said bicycle wheel.

2. The apparatus of claim 1 further comprising:

means to reduce the tendency of said apparatus to ride up in said legs, said means comprising a chamfer of predetermined angle and dimension, disposed at the outer edge of said annulus on said upper horizontal member.

3. The apparatus of claim 1 further comprising:

means to dispose, respectively, said annuluses of said upper horizontal member, and said tips of said lower horizontal member, so as to be equidistant from said central axis of said vertical member, said means comprising a syncline groove disposed on the respective circumferences of said horizontal members, the center of said syncline groove being at the midpoint of said central axis of said lower horizontal member and at the midpoint between the annuluses of said upper horizontal member, said horizontal members being retained in said vertical member by a set screw of predetermined size, and having an oval head, the axis of said set screw being perpendicular to said central axis of said vertical member, and perpendicular to said respective central axis of said horizontal member, said set screw projecting into and cooperating with said syncline groove so as to preclude horizontal movement of said horizontal members.

* * * * *